INVENTOR
TIM H. HOULE
BY
Andrus & Starke
Attorneys

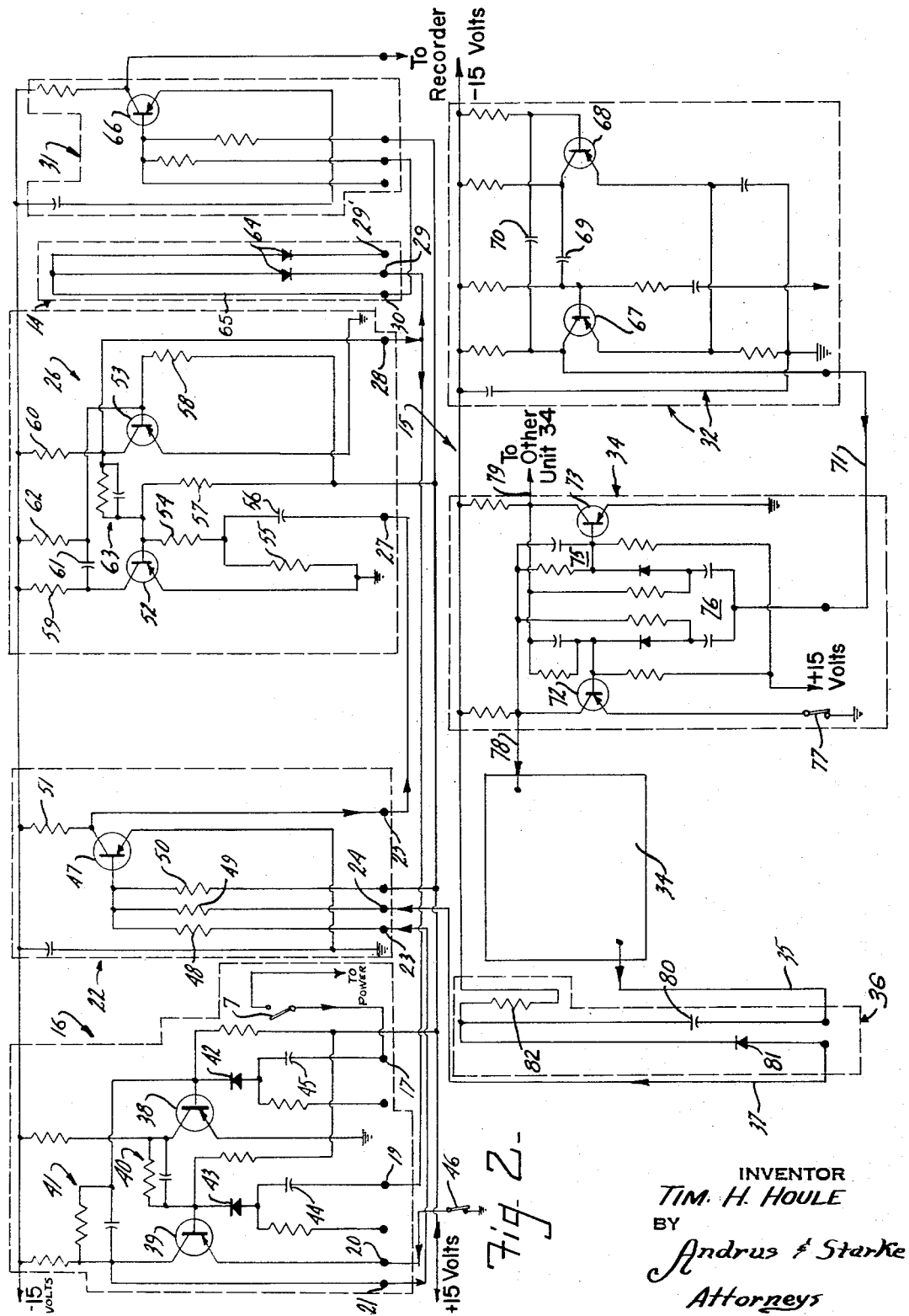

United States Patent Office

3,358,237
Patented Dec. 12, 1967

3,358,237
DATA PULSE COMBINING SYSTEM EMPLOYING SCANNER TO SEQUENTIALLY GATE PLURAL MEMORY CIRCUITS EACH HAVING AUTOMATIC RESET MEANS
Tim H. Houle, Wauwatosa, Wis., assignor to A. O. Smith Corporation, Milwaukee, Wis., a corporation of New York
Filed Feb. 1, 1966, Ser. No. 523,981
10 Claims. (Cl. 328—104)

ABSTRACT OF THE DISCLOSURE

A liquid dispensing system includes a number of flow lines each of which includes a meter for opening and closing a switch in accordance with the flow. The total flow is to be recorded on a single counter. An electronic system sequentially transfers signals from the meter switches to a single counter through parallel channels each of which includes a separate memory. The output of the memory unit is connected to an "AND" gate which in turn has its output connected to a pulse generator. A second input to the "AND" gate is derived from an electronic sequencing scanner which sequentially and cyclically interrogates each of the gates at a greater rate than the maximum opening and closing of the meter switches. If memory unit has been set by the closing of a switch and an interrogation signal is simultaneously applied to the gate, an output signal is applied to the pulse generator to generate a square wave output. The pulse generator of each channel is connected to the common summing circuit and also to the reset of the related memory unit in the corresponding channel. The leading edge of the square wave output passes the summing circuit and operates the common counter. The trailing edge of the square wave signal resets the memory or storage unit.

---

Figure 1:
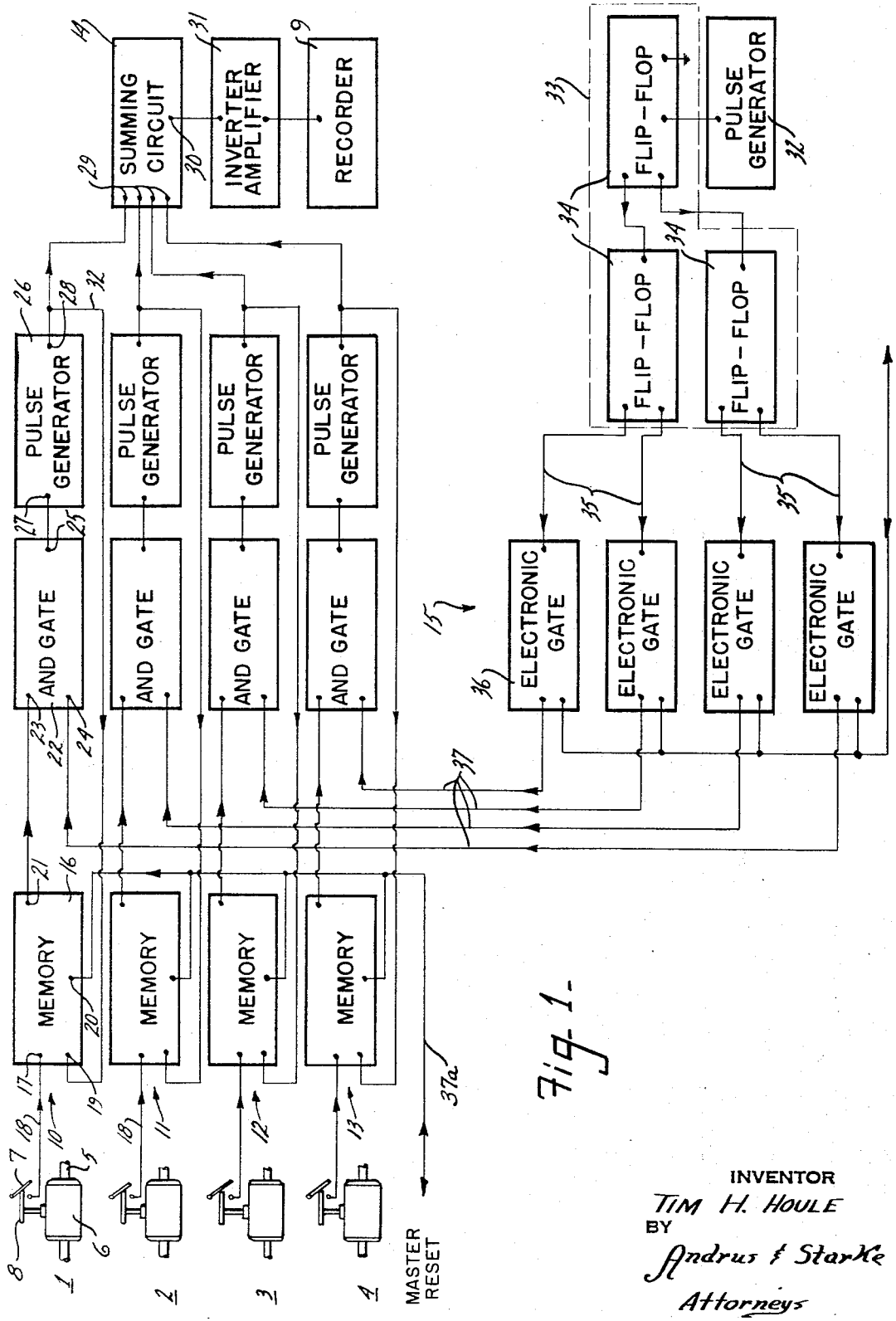

This invention relates to an electronic pulse combining apparatus and particularly to such an apparatus for combining a plurality of synchronous pulse trains into a single train of pulses of a minimum spacing and with each pulse of a predetermined width.

In modern-day processes and load controls or systems, the operation or state of the various loads or processes being controlled can conveniently be converted into related pulse trains. In many cases it is desired to totalize the effect of a plurality of loads and this can be conveniently accomplished by transmitting such pulse trains through a combining or summing apparatus to form a single composite pulse train for operating a recording or other suitable pulse repsonsive device. For example, in petroleum bulk loading plants, a number of loading areas will be provided from which the stored products are withdrawn. A plurality of simultaneous deliveries may be made from the several loading areas and it is desired to record the total amount of product which has been dispensed. Very accurate volumetric flow meters and the like for driving mechanical counters are well known and connected in the several flow lines. To combine the output of the several volumetric flow meters, which might be simultaneously operated, the mechanical output is conveniently converted to a pulse train by attachement of a suitable switch mechanism to the meter which is opened and closed in synchronism with the operation of the flow meter. In this manner each unit of flow through each line generates a pulse signal and the total flow is a corresponding pulse train. These pulse trains are transmitted to a combining or summing apparatus to record the total flow. However, it is important that the summing apparatus separately transmit pulses which arrive on the several channels at the same time such that all pulses are counted. Generally, it is known to store the pulses which are sequentially withdrawn therefrom in order to provide the desired sequence in totalizing of the several pulse trains in a highly accurate and reliable manner. For example, the July 1964 issue of Control Engineering at pages 65–67 discloses a pulse sequencing and totalizing device which can be employed to combine several pulse trains into a single pulse train.

The present invention is particularly directed to a solid state combining system and pulse summing apparatus providing an exceptionally high degree of reliability and security in connection with the counting of several pulse trains.

Generally, in accordance with the present invention, an electronic storage system is provided having a separate transmitting channel and storage means for each pulse train. An incoming pulse train actuates a memory device to store the first pulse. An electronic scanner periodically and cyclically interrogates each of the channels and if a pulse has been stored therein the pulse is automatically transferred into the summing apparatus. Simultaneously, the transmitted pulse is connected to clear the memory device for that channel. Thus, the pulse that counts also resets.

Generally, the storage or memory device is an electronic flip-flop having at least two input elements, one of which is a pulse input element for automatically establishing an output at an output element upon receipt of a pulse. The second input element is a reset element which is effective to clear the pulse from the output element upon pulses energization thereof.

The output of the memory device or the flip-flop is connected to an electronic transfer gate also having a pair of inputs one of which is connected to the output of the memory device and the second of which constitutes an interrogation input.

The gate device requires simultaneous signals at the pulse element and the interrogation element to provide an output. Consequently, triggering of the memory device stores a pulse which also appears as an electrical signal at the gate. This condition is maintained until a signal is applied to the interrogation element at which time the pulse set in the memory device is transmitted through the gate. In accordance with the present invention, the transmitted pulse energizes a pulse generator such as a monostable multivibrator which generates a single pulse of a preselected width for each input energization. The output of the pulse generator is simultaneously applied to a summing apparatus and to the reset element of the memory device. Consequently, the pulse is added to the composite pulse train and simultaneously clears the memory device.

The scanner of the present invention preferably includes an electronic pulse generator such as an astable multivibrator which is connected to a countdown sequencer. A plurality of electronic gates, one for each of the channels, is connected to the corresponding interrogation elements of the several electronic gates of the several transmitting channels. The countdown sequencer generates square wave input signals to the related electronic gates of the scanner. The signals are out of phase by equal angles and the electronic gates are differentiating circuits and provide a sharp pulse signal for each input pulse of the square wave signal. The interrogation pulse trains are thereby equally shifted and applied in sequence to the interrogation elements of the electronic transfer gates of the transmitting channels. Consequently, each of the channels will be periodically interrogated in timed relation to all of the other channels and in sequence such that at not time will more than one channel be interrogated and consequently no more than one pulse can be transmitted to the summing apparatus at any one time. The scanner interrogates the several storage channels at a rate at least as great, and preferably greater, than the maximum rate of generation of the several pulses in the several trains times the number of channels which are to be summed. In this manner each channel will be interrogated at least once after a pulse has been set in the memory device and before another pulse is sent to the same memory device. Consequently, each pulse will be counted and the memory circuit reset in an accurate and reliable manner.

The present invention provides a very reliable system having exceptionally long life normally associated with solid state devices. Further, as a result of the solid state and repetitious use in the channels the several components can be made of a modulator type construction wherein each of the modules is mounted as a separate board and inserted into the circuit through a plugboard construction or the like.

The drawing furnished herewith clearly illustrates the above advantages and features as well as others which will be clear from the following description and explanation of the preferred embodiment of the present invention.

In the drawings:

FIG. 1 is a block diagram of a pulse combining system constructed in accordance with the present invention and applied to summing the pulse trains generated as a result of flow in a plurality of pipes or lines or the like; and FIG. 2 is a schematic circuit diagram showing preferred circuitry for the several components shown in diagram in FIG. 1.

Referring particularly to FIG. 1, the present invention is illustrated as applied to a petroleum bulk station wherein relatively large quantities of petroleum products are maintained in storage tanks, not shown. The stored products are transferred to tank trucks or the like for delivery to retail distributing establishments. Generally, such bulk stations or the like include a plurality of loading areas or stations 1-4, each of which is similarly constructed to be selectively connected to the various product lines in the station for delivery to suitable tank trucks through a delivery or flow line 5. Each of the lines 5 includes a suitable flow meter 6 of the volumetric variety which provides a mechanical output closely and very accurately related to the volumetric flow through the line. To convert the mechanical output to a pulse train, a pulse switch 7 is diagrammatically shown mounted as a part of the flow meter 6 and coupled to a cam 8 on the output shaft of the flow meter 6 to be opened and closed in synchronism with the operation of the flow meter. The opening and closing of the switch 7 therefore creates an intermittent operation of an electrical circuit and thereby generates a related pulse train. The pulse trains generated by the several pulse switches 7 of the several loading stations 1-4, inclusive, are transmitted to a remote recorder 9 to record the total volumetric flow for any given period.

The pulse trains are individually transmitted through related transmitting channels 10 through 13, inclusive, to a pulse collector or summing circuit 14, which takes the several independent pulse trains and sums them into a related single pulse train suitable for operating of recorder 9. An electronic scanner 15 is connected to the transmitting channels 10-13 and cyclically and sequentially actuates the transmitting channels to transmit a related pulse from the individual pulse train to the summing circuit 14. The scanner 15 operates at a rate in excess of the maximum operating rate of a switch 7 and consequently is effective to transmit all pulses to the summing circuit 14.

More particularly, the first transmitting channel 10 is described in greater detail for purposes of simplicity and clarity of explanation. It is to be understood that all other channels are similarly constructed and the components of the other channels are identified by similar primed numbers.

Referring to transmitting channel 10, a storage or memory unit 16 is provided having a pulse set line or terminal 17 connected by a suitable transmission line 18 to the corresponding pulse switch 7. The memory unit 16 also has a reset terminal 19 and a master reset terminal 20 with the three terminals 17, 19 and 20 controlling the signal condition at an output terminal 21. The storage or memory unit may be any suitable electronic device; for example, such as the solid state flip-flop circuit which is shown in FIG. 2 and more fully described hereinafter.

In the following discussion and particularly with respect to FIG. 2, the output of the several elements is designated as a one output signal or a zero output signal for clarity of description. In the embodiment of FIG. 2, a zero output refers to a ground or positive signal while a one output refers to a negative signal.

A signal at the reset terminal 19 or the master reset terminal 20 establishes a one output at the output terminal 21. An input pulse applied to the set terminal 17 establishes a zero output signal at terminal 21 which is maintained until the memory device is reset by an appropriate signal at terminal 19 or 20.

The operation of the switch 7 therefore generates a pulse which triggers the storage or memory unit 16 to establish a zero output signal at output terminal 21 which is maintained until the device is reset. The output of the storage or memory unit 16 is connected to operate electronic transfer gate 22. Generally, the gate 22 includes a pulse transfer terminal 23 connected to the output terminal 21 and an interrogation terminal 24 connected to the scanner 15. The electrical condition at terminals 23 and 24 controls the output condition at an output terminal 25 such that an output appears at terminal 25 only when zero signals are simultaneously applied to the terminals 23 and 24. Consequently, if a pulse has been stored in unit 16 and the scanner 15 applies an interrogation pulse to the terminal 24, the electronic gate 22 is triggered to establish an output signal.

This signal is applied to a pulse forming unit or generator 26 which may take the form of a monostable multivibrator having an input terminal 27 connected to the output terminal 25 and having an output terminal 28. The output pulse of the generator 26 is a pulse signal of a predetermined constant width for each input pulse or signal. The output terminal 28 of generator 26 is connected to one of a plurality of input terminals 29 of the summing circuit 14.

The summing circuit establishes an output pulse signal at the output terminal 30 whenever an input pulse is applied to any one of the inputs 29. In this manner, the several pulse trains are applied to the summing circuit 14 and appear at the output terminal 30 as a single train of pulse signals connected to operate the recorder 9.

In the illustrated embodiment of FIG. 2, the output of the summing circuit 14 is a train of negative pulses which must be inverted to operate the recorder 9 and to maintain correspondence between FIGS. 1 and 2, an inverter amplifier 31 is shown connected between unit 14 and recorder 9.

In accordance with this invention, the output terminal 28 of the generator 26 is also connected by a channel reset line 32 to the reset terminal 19 of the corresponding storage or memory unit 16. Consequently, the same pulse that is transmitted to the summing circuit 14 to effect a count is simultaneously fed and effects a resetting or clearing of the corresponding memory unit 16 to reset the channel to receive the next pulse resulting from operation of switch 7.

Generally, the illustrated electronic scanner 15 includes a pulse generator 32 such as an astable multivibrator which establishes a square wave signal which is connected through a binary type counter 33. The illustrated counter 33 includes a tree of three flip-flop circuits 34 interconnected to establish square wave output signals at each of a plurality of output lines 35, one for each of the transmitting channels. Each of the lines 35 is connected as an input to a corresponding differentiating electronic gate 36 which establishes a corresponding train of sharp pulses connected to the corresponding interrogation terminals 24 via suitable connecting lines 37.

The operation of the illustrated embodiment of the circuit is described assuming flow lines 5 of channels 1 and 2 are being simultaneously in use and consequently are simultaneously generating synchronous pulse trains on lines 18 and 18' which are to be combined into a single pulse train of pulses of a selected minimum spacing and duration.

Each pulse train is transmitted over its own transfer line 18 and 18' from the corresponding switches 7 and 7' to the corresponding memory or storage unit 16 and 16'. If simultaneous pulses are applied to the channels of areas 1 and 2 both of the memory units 16 and 16' are simultaneously triggered to the set condition and transmit a signal to the corresponding electronic transfer gate 22 and 22'. However, neither signal is transferred beyond the gate point but is stored in the respective storage unit until such time as the scanner 15 scans the respective channels.

The scanner 15 generates the pulse signals at lines 37 and 37' which are spaced from each other and transmitted to the interrogation terminals 24 and 24' in timed spaced relation. If the next scanner pulse is applied to the gate 16 of channel 10 the gate is triggered to transfer the signal to the generator 26 which automatically completes one cycle of operation generating an output pulse of a predetermined width. This pulse is transferred back through the reset line 32 to the reset terminal 19 of the related channel 1 and resets the memory unit 16. Simultaneously, the output pulse is applied to the summing circuit 14 and appears at the output terminal 30 as one pulse in the composite train which is inverted and amplified to provide proper operation of the recorder 9. This pulse is thereby inserted in the composite output pulse train and also been removed from the transmitting channel 1. If no other pulses are fed from the switch 7 to the memory unit 16. The circuit remains in the standby position. However, a subsequent pulse from switch 7 of channel 1 is similarly transmitted and stored in the memory device 16 for subsequent transfer when the next scanning or interrogation pulse is applied to terminal 24 with the same sequence as that just described.

Further, the scanner 15 proceeds to interrogate the other channels and when it reaches channel 11, the electronic transfer gate 22' is triggered to transmit the pulse which was stored simultaneously with the pulse in channel 10. In the same manner, the transferred pulse actuates the related generator 26' to produce a related pulse of predetermined width which is simultaneously fed back to reset the memory unit 16' of channel 11 and fed to terminal 29' of the summing circuit 14 to generate or produce a pulse in the composite pulse train for operating recorder 9.

The scanner 15 therefore continuously interrogates the several channels 10–13 in a repetitive sequence to combine the several pulse trains into a signle composite pulse train. In order to establish proper sequencing, a master reset line 37a is connected to all terminals 20 of the memory units 16 to reset them to start position.

Referring particularly to FIG. 2, a schematic diagram of a preferred circuit for the several elements shown in block diagram in FIG. 1 is illustrated. The corresponding components are identified by similar numbers for simplicity and clarity of explanation.

Referring particularly to FIG. 2, the memory unit 16 is shown as an electronic solid state bistable multivibrator or flip-flop circuit employing a pair of PNP type transistors 38 and 39. Each of the transistors is connected in a common emitter configuration to the suitable low voltage D.C. power supply, as shown by the supply lines marked respectively as −15 volts and +15 volts. The input and output circuits of the transistors 38 and 39 are connected by similar resistor-capacitor networks 40 and 41. Input or steering diodes 42 and 43 are connected to the input bases in series with a coupling capacitor, 44 and 45, respectively. The output terminal 21 is connected to the collector of the transistor 39.

The master reset line 37 is connected to ground and to the emitter of the transistor 39 through terminal 20. A common switch 46 for all circuits is connected in line 37 to momentarily open the circuit. This provides a relatively positive signal to the emitter which drives the transistor 39 to cutoff and through the network 41 drives transistor 38 to conduct. The collector of transistor 39 is therefore held at a one output corresponding generally to the negative potential or the supply line.

In operation, a zero signal at the input terminal 17 of the transistor 38, as a result of the closing of switch 7, drives it into cutoff and through the regenerative resistor-capacitor network 40, drives the other transistor 39 to conduct. Switch 7 is shown connected directly to transistor 24. In actual practice a pulse shaping circuit, not shown, is preferably inserted therebetween to produce a pulse having a rapid ride time for operation of the memory flip-flop circuit. This condition is maintained independently of any further input signals at the input terminal 17 of the transistor 38. However, a reset pulse at the terminal 19 or 20 acts in a reverse manner to drive the transistor 39 into cutoff and transistor 38 to conduction to reset the circuit to the initial state. Consequently, the output signal at terminal 21 is normally at a negative potential corresponding to the designation one as a result of the cutoff of the transistor 39.

In this manner, an output signal at the output terminal 21 of the memory unit 16 is selectively applied to the transfer gate 22 which is shown in FIG. 2 as a transistor 47 requiring simultaneous zero input signals to establish conduction. The transistor 42 is connected in a common emitter configuration to a suitable power supply line. A pair of input or coupling resistors 48 and 49 and a bias resistor 50 are connected in parallel to the base of the transistor 47. The resistor 50 has the opposite end connected to the +15 volt power supply line. The opposite ends of resistor 48 and resistor 49 are connected to the input terminals 23 and 24, respectively, and therefore to the memory circuit 16 and scanner 15, respectively. The output terminal 25 is connected to the collector of the transistor 47. The collector of transistor 47 is also connected to the −15 volt line via a resistor 51. When either input terminal 23 or 24 is connected to a negative or one signal, the transistor conducts and the collector is effectively grounded providing a zero output which corresponds to a standby position. Whenever the input terminals 23 and 24 are both connected to zero signal, the transistor 47 cuts off and a negative voltage or a one output appears at the collector and therefore at terminal 25 corresponding to a transfer signal condition.

In operation, the output of the flip-flop circuit or memory unit 16 is negative unless a pulse is set therein. This holds transistor 47 conducting and in the standby position. When a pulse is set in unit 16, the output goes to a one output and consequently conditions the transistor 47 for transmission of a pulse. However, a negative signal still appears at the interrogation terminal 24 and maintains the transistor 47 conducting with a ground signal at the output terminal 25. When the scanner 15 interrogates the first channel, it effectively grounds or establishes a one signal at the interrogation terminal 24 and consequently when a pulse is set in the unit 16 both of the input terminals 23 and 24 are grounded or receive a one signal. The transistor 47 will rapidly switch to a non-conducting state and a negative voltage or one signal appears at the collector and the output terminal 25 which is effective to trigger the pulse generator 26.

The pulse generator 26 is shown as a solid state monostable multivibrator employing a pair of transistors 52 and 53 connected in a common emitter configuration to the positive and negative voltage supply lines. The transistor 52 has its base connected with a pair of resistors 54 and 55 to ground in common with the emitter. An input capacitor 56 is connected between the junction of the resistors 54 and 55 and the input terminal 27. The base is also connected to the +15 volt supply line in series with a resistor 57. The second transistor also has its base connected to the +15 volt supply line through a resistor 58. The collectors are similarly connected to −15 volt supply line in series with suitable resistors 59 and 60, respectively. A timing capacitor 61 connects the base of transistor 53 to the collector of transistor 52 and a timing resistor 62 is connected directly between the −15 volt line and the base of transistor 53. A resistor-capacitive network 63 connects the collector of transistor 53 to the base of transistor 52. In the normal state, the transistor 53 is biased to conduct and the transistor 52 is biased to cut off. In this state, the collector of the transistor 53 which is connected to the output terminal 28 is at the relative reference or ground level providing a one output signal. When a negative pulse is received from the transfer gate 22, the transistor 52 is biased to conduct, and rapidly turns on and the transistor 53 is correspondingly rapidly turned off. When this occurs, the output voltage at the collector rapidly drops to approximately the negative 15 volts of the −15 volt line providing a zero output signal. The capacitor 61 then discharges through the resistor 62 and transistor 52 until the base bias of transistor 53 becomes negative and transistor 53 begins to conduct and through the network 63 resets the circuit to the original state.

The output reversal is established for a preselected time after which the circuits will automatically return to the initial condition.

In summary, the monostable multivibrator is responsive to a negative pulse signal to convert or change its output condition from zero to a positive signal for a very accurately controlled predetermined time. The output is therefore an elongated pulse of a predetermined magnitude and width. It is this square wave pulse which is simultaneously fed to the summing apparatus 14 and to the reset terminal 19 of the memory unit 16. The leading edge of the pulse is operative to actuate the summing apparatus and the counter 9. The trailing edge of the pulse applied to the reset terminal 19, as previously described, causes the flip-flop circuit of FIG. 2 to revert to the normal state and clears the previous pulse set therein. This also removes the conditioning signal from the terminal 23 of electronic gate 22.

The pulse transmitted to the summing apparatus appears at the output line as an output signal of a corresponding pulse width. The illustrated summing apparatus is an "or" function device including a plurality of diodes 64 having one side connected in common to an output line 65 which connects to output terminal 30 and the opposite side connected to the individual input terminals 29 and 29′ which in turn are connected to the several channels. Each diode 64 transmits the negative voltage signal from the generator 26 for the corresponding period. As a result of the operation of the scanner 15, the square wave pulse signals are sequently applied to the several input terminals 29 and 29′ of the summing apparatus 14 and the output is a train of similar pulses each related to an input signal. If all the switches 7 are operating and pulse trains are being transmitted to the several channels, the output is a single series of pulses; all the pulses being similar to each other and spaced in accordance with the frequency of the scanner operation. This establishes a minimum spacing which can occur between pulses. If any one of the inputs is not receiving a pulse signal as a result of lack of operation of corresponding switch 7, there is no pulse in the output train therefrom and consequently the adjacent pulses are spaced by correspondingly greater amounts or angles. The pulses in the train are negative pulses in the illustrated embodiment. The recorder 9 requires a positive pulse and the inverter amplifier 31 is employed. As shown, amplifier 31 is a single stage amplifier having a transistor connected in a common emitter configuration with the input signal applied to the base and an output signal taken from the collector. This merely inverts the sense of the signal and provides a positive polarity pulse for each negative pulse to properly operate the recorder 9.

The illustrated scanner circuit 15 which provides the pulse train to each of the interrogation terminals 24 in timed spaced relation is preferably a solid state device such as shown in FIG. 2. The input of the scanner 15 is the pulse generator shown as an astable multivibrator including a pair of transistors 67 and 68 connected in a common emitter configuration. The collector of each transistor 67 and 68 is connected to the base of the opposite transistor by coupling capacitors 69 and 70, respectively. The multivibrator is a free running multivibrator providing the collector of transistor 67 which is applied via a lead 71 to the binary counter 33. The frequency of the signal is determined by the bias elements shown. As the circuit is a typical multivibrating circuit and will be readily understood by those skilled in the art, no further description is given.

In the illustrated embodiment of the invention, the counter 33 generally includes three flip-flop circuits 34 connected in a tree with the initial flip-flop connected to the output of the astable multivibrator or generator 32. Each flip-flop 34 is similarly constructed and only the first is shown in detail. Generally, the circuit includes a pair of transistors 72 and 73 connected in common emitter configurations and having resistor-capacitor coupling networks 74 and 75 respectively interconnecting the base of one transistor to the collector of the opposite transistor. An input network 76 is connected to line 71 and to the bases of the transistors 72 and 73. The output signals are taken from the collectors of transistors 72 and 73 and are a pair of square wave signals which are 180° out of phase. The signals are impressed upon the other two counting flip-flop circuits 34. A reset switch 77 connects the emitter of transistor 72 to ground and is momentarily opened to set the flip circuit in a standby or start position.

The two output signals from the transistors 72 and 73 are connected as the input to the second pair of flip-flop circuits via the lines 78 and 79. The two secondary flip-flops provide a total of four output signals, each of which is a square wave signal. The signals at lines 37, 37′, 37″ and 37‴ for the respective channels 10–13 are time spaced from each other by ninety degrees to sequentially and cyclically actuate the channels, as follows. In a typical application the free running or astable multivibrator 32 may provide an output having a frequency of 400 cycles per second such that the input to each gate 36 is a square wave signal having a frequency of 100 cycles per second.

The square wave signals are applied to interrogation terminals 24 of the related channels via the gates 36.

Each of the gates 36 is a differentiating circuit which converts the leading positive going edge of each of the square wave input signals into a sharp pulse. Each gate 36 includes a capacitor 80 connected between the input line 35 from the counter 33 and a diode 81 which is connected to the output line 37 of the related gate 36. A resistor 82 is connected between the junction of the diode 81 to the capacitor 80 and the −15 volt supply line. The output of the gate 36 is therefore a series of pulses related to the positive going edge of the square wave input signal established by the counter 33. These gate pulses correspond to a zero output signal and are sequentially applied to the interrogation terminal 24 of the electronic gate circuit 22 of the corresponding channel 10 to properly interrogate the channel. The interrogation pulses are applied to the interrogation terminals 24 of the electronic gates in the four channels 10–13 in sequence and repetitive cycles. The timed relation is related to the maximum pulse rate of any given pulse train from the several load areas and will always be at least as great and probably greater than such maximum rate times the number of channels being scanned. Consequently, each channel is interrogated within the time period existing between pulses in the load responsive pulse trains. The scanner thus controls the release of the pulses in a sequential manner such that never can two or more load areas be simultaneously interrogated or can the pulses be transmitted simultaneously.

In summary, when the scanner 15 interrogates any one of the gates 22, the voltage of the coresponding input terminal 24 is momentarily made a zero signal. If the other input terminal 23 has been also placed at a relatively zero signal level, because of a stored pulse in the preceding memory unit 16, the electronic gate 22 delivers a pulse to the generator 26 which in turn delivers a pulse of a predetermined width. The fixed width pulse is brought into the summing apparatus, inverted by the inverter amplifier 31 and applied to the recorder 9. Simultaneously with transfer of the fixed width pulse to the summing apparatus, it is fed back through the reset line 32 to the reset terminal 19 of the memory unit 16 and resets the memory unit to the normal state so it can accept another pulse. The next time the scanner 15 interrogates the same channel, the terminal 23 of the gate 22 is held at the relative negative potential if no pulse is stored in memory unit 16 and no output signal is fed to the generator 26 and consequently no pulse signal is fed to actuate the recorder 9. In this manner, each of the channels 10–13 is sequentially interrogated and provides a standardized pulse only in response to a stored pulse. As the scanner advances from one channel to the next, the above sequence of events is constantly repeated, depending upon whether or not a pulse has been set in the memory device.

The solid state combining pulse conduit has been proven to provide a highly reliable multiple input totalizing system having a very high degree of logic security. Thus, the input signal to the respective memory circuit will never be erased unless and until the pulse signal has been collected and included in the count of the summing circuit because the same pulse is employed for counting and for resetting of the memory unit.

Various modes of carrying out the invention are contemplated as being within the scope of the following claims particularly pointing out and distinctly claiming the subject matter which is regarded as the invention.

I claim:

1. An electronic pulse combining apparatus for combining a plurality of parallel electrical pulse trains from different sources into a single series of time spaced pulses, comprising a plurality of channels one for each pulse train and each of which comprises an electronic storage means having a set element and a reset element and an output element, said set element being connected to a related pulse source and changing the signal at the output element in response to an input pulse, a scanning unit having a plurality of output means one for each channel and means establishing similar interrogation signals at said output means, said interrogation signals being sequentially and cylically established at the output means, a summing apparatus having a plurality of input elements one for each channel, and transfer means in each channel having an input means connected to the storage means and the scanning unit and an output means connected to the summing apparatus and to the storage means and responsive to a signal from the scanning unit in the presence of a signal from the storage means for transmitting a signal from the transfer means to the summing apparatus and simultaneously transmitting a signal to the reset element of the storage means to reset the storage means.

2. The pulse combining apparatus of claim 1 wherein said transfer means includes an electronic gate having a pair of input elements and an output element, one of said input elements being connected to the output element of said storage means and the other of said input elements being connected to the scanning unit, and a pulse generator connected to the output element of the gate to provide a pulse of a preseleced width and having an output element connected to the reset element and to the summing apparatus.

3. The pulse combining apparatus of claim 1 wherein said storage means is a bistable electronic circuit, said transfer means includes an electronic gate having a pair of input elements and an output element, one of said input elements being connected to the output element of said storage means and the other of said input elements being connected to the scanning unit, and a pulse generator connected to the output element of the gate to provide a pulse of preselected width and having an output element connected to the reset element and to the summing apparatus.

4. The pulse combining apparatus of claim 1 wherein said storage means is a bistable flip-flop circuit having a pair of transistors interconnected by coupling networks whereby a pulse to the set element establishes one circuit condition at the output element and a pulse to the reset element to establish an opposite circuit condition at the output element, said transfer means includes a transistor having a plurality of input elements connected respectively one each to the bistable flip-flop circuit and to the scanning unit and having an output element, said transfer means further including a monostable multivibrator having a pair of transistors interconnected by coupling networks to establish one circuit condition at an output element and having an input element to said multivibrator to reverse said circuit condition, said input terminal being connected to the output terminal of the electronic gate.

5. The pulse combining apparatus of claim 4 wherein the scanning unit includes means to generate a series of pulses, an electronic countdown sequencing means connected to said means and producing phase shifted square wave signals at a plurality of output lines, one for each of said channels, and an electronic differentiating circuit for each channel connecting the corresponding output line to the transfer means.

6. The combination of claim 1 wherein said scanning unit includes means to generate a series of pulses, an electronic countdown sequencing means connected to said means and producing phase shifted square wave signals at a plurality of output lines, one for each of said channels, and an electronic differentiating circuit for each channel connecting the corresponding output line to the transfer means.

7. The combining apparatus of claim 2 wherein said storage means comprises a bistable flip-flop circuit, said electronic gate comprises "and" logic circuit, and said generator comprises a monostable multivibrator.

8. The combining apparatus of claim 4 wherein said summing apparatus comprises a plurality of diode differentiating circuits having individual inputs and a common output.

9. An electronic pulse combining apparatus for combining a plurality of parallel similar pulse trains into a single series of time spaced pulses, comprising a plurality of channels each of which comprises, an electronic transistorized flip-flop circuit having a set element and a reset element and having an output element, said set element being connected to a source of the related pulse train and changing the signal at the output element in response to a received pulse, a transistor gate having a pair of input elements and an output element, one of said input elements being connected to said output element of said flip-flop circuit, said gate serving to transmit a pulse in the presence of simultaneous signals from the storage means and an interrogation signal, a monostable multivibrator employing transistors and connected to the output element of the gate and providing a pulse of a preselected width at an output element in response to an input pulse, circuit means connecting the output element of the monostable multivibrator to the reset element of the storage means, an electronic scanner having separate output means connected to each of the second input elements of said electronic gates in the several channels, and a summing device having a plurality of input elements one of which is connected to the output element of the monostable multivibrator and the other of which is similarly connected to the monostable multivibrator of other channels.

10. The apparatus of claim 1 wherein the transfer means includes a square wave generator having a square wave output signal pulse and said summing apparatus is connected to said generator and responds to the leading edge of said pulse and the storage means is connected to said generator and responds to the trailing edge of said pulse.

References Cited

UNITED STATES PATENTS

| | | | |
|---|---|---|---|
| 2,906,869 | 9/1959 | Kramskoy | 328—154 X |
| 3,061,815 | 10/1962 | Tumes | 328—104 X |
| 3,078,378 | 2/1963 | Burley et al. | 307—88.5 |

J. S. HEYMAN, *Primary Examiner.*